April 30, 1963   R. J. GORSKY   3,087,589
ONE-WAY DEVICE
Filed Sept. 16, 1960

INVENTOR.
Rudolph J. Gorsky
BY
Hugh L. Fisher
ATTORNEY

United States Patent Office 3,087,589
Patented Apr. 30, 1963

3,087,589
ONE-WAY DEVICE
Rudolph J. Gorsky, Fenton, Mich., assignor to General Motors Corporation, Detroit, Mich., a corporation of Delaware
Filed Sept. 16, 1960, Ser. No. 56,424
4 Claims. (Cl. 192—45)

This invention relates to improvements in one-way devices.

One of the concerns in any one-way device, whether functioning as a clutch or a brake, is the maintenance of concentricity between the inner and outer races, for eccentricity can produce several undesired results. For example, under substantial loads severe wear, which appears as a scoring of the races, can occur and even breakage can result in some extreme cases. When the races become scored, the operation of the wedging devices in moving to and from the wedging position can be impaired to a point where the wedging elements no longer perform their individual functions. Also, during free wheeling, if there is run-out between the races due to the presence of any eccentricity, any resultant contact between the races will generate excessive heat and reduce the efficiency of the apparatus in which the device is used.

Moreover, attempts to overcome the concentricity problem must keep in mind the need for proper lubrication of any bearing surfaces as well as the requirement that frictional resistances be a minimum. Additionally, the device should be suited for construction according to accepted mass production techniques.

Accordingly, the invention contemplates a novel one-way device that in a unique way causes the races to be maintained concentric within accurate limits, that facilitates lubrication thereof during operation, and that offers minimum frictional resistances. More specifically, it is proposed by the invention to provide one of the races with bearing portions that afford a bearing area for engaging the other race and of a configuration that enhances lubrication of the bearing areas and that offers minimum frictional resistance. This is accomplished by utilizing an inherently available portion of the race and is attainable by mass production techniques.

The foregoing and other objectives and advantages of the invention will become apparent from the following description and from the accompanying drawings in which.

Figure 1:
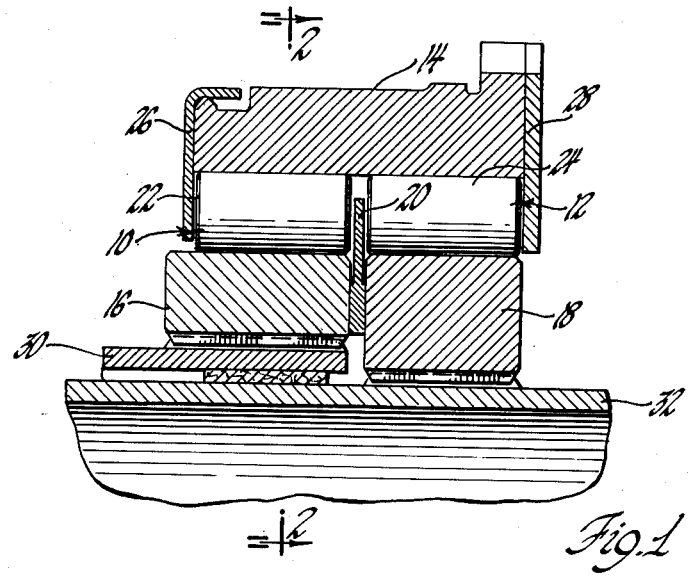
FIGURE 1 is a sectional view of one-way devices incorporating the principles of the invention.

Referring now to the drawings in detail and particularly to FIGURE 1, the construction there shown employs two one-way devices generally designated by the numerals 10 and 12 compactly arranged so as to consume a minimum of both axial and diametrical space. The devices 10 and 12 have a common outer race 14 and each is provided with an individual inner race as those denoted by the numerals 16 and 18. These inner races 16 and 18 form parts respectively of the one-way devices 10 and 12 and are separated by a spacer 20. The one-way device 10 includes a series of wedging elements as rollers 22 and the one-way device 12 has similar wedging elements, e.g., rollers 24. The rollers 22 are maintained in the illustrated position by a retainer 26 secured to the outer race 14, whereas the rollers 24 are axially positioned by an annular retainer 28 also joined to the outer race 14. The inner races 16 and 18, in completing the construction, are splined respectively to shafts 30 and 32.

Whether the shafts 30 and 32 function as driving members or driven members while the outer race 14 is performing respectively as a driven or driving member will be determined by the application of the devices 10 and 12. If the devices are to be used as a clutch, it may be desirable to have the outer race 14 as the driving member rather than the shafts 30 and 32. On the other hand, if the devices 10 and 12 are to perform as a brake, then either the outer race 14 or the shafts 30 and 32 may be held against rotation as desired. In this embodiment, the devices 10 and 12 will be described as brakes with the outer race 14 appropriately grounded.

Figure 2:
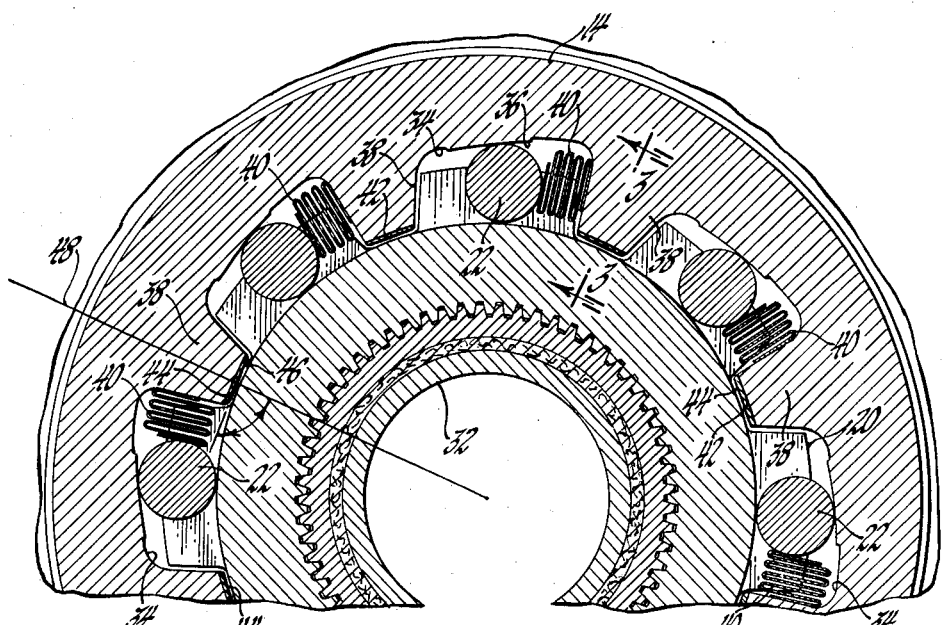
FIGURE 2 is a sectional view of the devices looking in the direction of arrows 2—2 in FIGURE 1.
Figure 3:
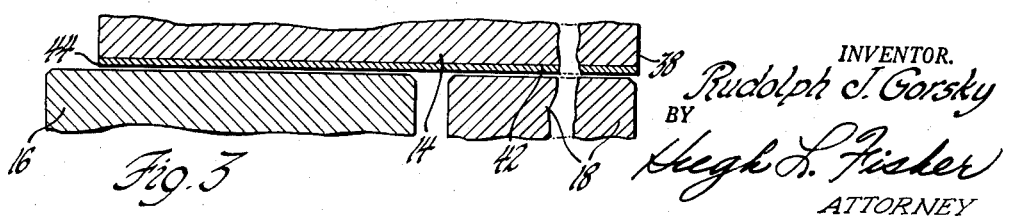
FIGURE 3 is a fragmentary sectional view taken along line 3—3 of FIGURE 2 depicting a bearing area of the devices.

In now considering FIGURE 2, it will be noted that the outer race 14 is provided with a series of inwardly opening recesses 34 diametrically spaced apart in the bore thereof. These recesses 34 are defined by cam surfaces 36 and projections 38, which separate the cam surfaces 36. If preferred, the recesses 34 can be formed on the inner races 16 and 18 and will of course open outwardly therefrom. Each of the recesses 34 receives one of the rollers 22 as seen in FIGURE 2 and has an energizing provision for urging each of the rollers 22 to the wedging position. This energization is preferably achieved by accordion type springs 40 interposed between the rollers and the projections 38 so as to urge the rollers 22 in the depicted direction and thereby cause the devices 10 and 12 to lock whenever the shafts 30 and 32 are revolved counterclockwise as viewed in FIGURE 2, assuming the outer race 14 is restrained from rotation.

From an inspection of FIGURE 2, it can be appreciated that if the races 16 and 18 are not maintained concentric with respect to the outer race 14, the rollers 22 will not each share the proper proportion of the load, and if excessive, a foot portion 42 of the projections 38 can rub against the peripheries of the inner races 16 and 18 and this will ultimately produce a scoring of the inner race surfaces. When scoring occurs, the resultant irregular surfaces can also interfere with the operation of the rollers 22 and 24 in moving to the wedging position as well as cause the surfaces of the rollers 22 and 24 to be damaged. For this reason, strips 44 are attached to the foot portions 42 made of a suitable lubricant retaining bearing material, e.g., a .010 thick strip of aluminum bronze, are suitably attached to the foot portions 42. If preferred, some installations may permit the foot portions 42 to be provided with a suitable lubricant retaining coating and hence, the strips 44 will not be required. In accordance with usual practice, my one-way device is arranged to operate in a lubricant environment sufficient to provide a lubricant film or coating on the rollers and on the other relatively movable engaging surfaces. For example, the one-way device may be employed in a power transmission mechanism and subjected to splash lubrication of a suitable oil.

To facilitate lubrication of these bearing areas between the foot portions 42 and the periphery of the inner races 16 and 18, and so that frictional drag will be at a minimum, the inner surface designated by the numeral 46 is made flat and normal to a radial line 48 extending approximately through the middle of each of the projections 38. Consequently, only a line contact can occur between the flat surface 46 and the periphery of the inner races 16 and 18, this occurring at the intersection of radial line 48 with the flat surface 46, and therefore, the contact area offers a minimum resistance to rotation between the races, this being particularly desirable during free wheeling.

The lubrication of the contact area is facilitated by the resultant wedge formed since the opening between the periphery of the races 16 and 18 and that of the flat surface 46 on the strips 44 decreases thus forming a capillary angle as the contact point is approached, the contact point being at the intersection of radial line 48 and flat surface 46. This aspect causes fluid lubricant as oil to be drawn into the contacting area and the resultant lubricant film will tend to separate the periphery of the races 16 and 18 from that of the flat surface 46, further facilitating the maintenance of concentricity between the inner and outer races.

It has been explained that with the installation shown in the drawings, the devices 10 and 12 will lock whenever the shafts 30 and 32 are rotated counterclockwise, individually or together, as viewed in FIGURE 2. With this construction, it can be seen that the foot portions 42 conventionally available when the outer race is broached, are utilized as bearing supports and that the use of a flat bearing surface affords line contact while encouraging and, in fact, inducing lubrication along the contacting area. This affords a simple, inexpensive way of achieving concentricity and proper lubrication. Moreover, the flat surface 46 can be broached, further facilitating the fabrication of the devices according to accepted manufacturing techniques.

The invention is to be limited only by the following claims:

1. In a one-way device, the combination of inner and outer coaxial races, one of the races having formed therealong projections spaced apart so as to provide a series of pockets therein, each pocket including a cam surface, a wedging element situated within each pocket and arranged to engage both the cam surface and the periphery of the other race so as to prevent relative rotation between the races in one direction, each projection having a bearing portion formed thereon and slidably supported on the other race, a coating of lubricant on the races and on said bearing portions, the bearing surface being flat and tangentially engageable with said other race, the flat surface forming a capillary angle with said other race, and said bearing portion having a lubricant retaining coating.

2. In one-way device, the combination of inner and outer coaxial races, the outer race having a series of diametrically spaced cam surfaces formed in the bore thereof and integral projections radially inwardly extending therefrom so as to separate each cam surface from the other, wedging elements engaging each of the cam surfaces so as to prevent relative rotation between the races in one direction, an energizing member urging the wedging elements toward a wedging position in which relative rotation between the races is prevented, each projection having a foot portion engageable with the periphery of the inner race, a coating of lubricant on the wedging element engaged race surfaces and on said foot portions and a strip of lubricant absorbent bearing material bonded to each foot portion providing a bearing surface for maintaining the concentricity of the races, the bearing surface being flat and in tangential engagement with said inner race to form a bearing area of minimum resistance and providing with the inner race a capillary angle which draws lubricant to the bearing area.

3. In a one-way device, the combination of inner and outer coaxial races, rotatably wedging members interposed between the races and preventing relative rotation of said races in one direction of rotation, a coating of lubricant on said races, one of said races having a series of circumferentially spaced projections extending therefrom and towards the other race, and a lubricant retaining portion on each projection having a flat surface in tangential supported engagement with said other race, said flat surface forming with the race a lubricant retaining wedge.

4. In a one-way device, the combination of inner and outer coaxial races and wedging means interposed between the races to prevent relative rotation therebetween in one direction of rotation, a coating of lubricant on the races and on said wedging means, one of the races having a projection radially extending therefrom and engageable with the other race, said projection terminating in a flat bearing surface normal to a radial plane of the races extending through the projection, said flat bearing surface being in tangential engagement with said other race and providing between said other race and said flat surface a capillary angle which feeds lubricant to the position of tangential engagement providing a minimum frictional resistance between said flat surface and said other race.

References Cited in the file of this patent

UNITED STATES PATENTS

| | | |
|---|---|---|
| 2,069,558 | Rauen et al | Feb. 2, 1937 |
| 2,096,438 | Rockwell | Oct. 19, 1937 |
| 2,299,739 | Colucci | Oct. 27, 1942 |
| 2,753,229 | Queer | July 3, 1956 |
| 2,902,125 | House et al. | Sept. 1, 1959 |

FOREIGN PATENTS

| | | |
|---|---|---|
| 1,189,747 | France | Mar. 23, 1959 |